(12) United States Patent
Wu et al.

(10) Patent No.: US 7,606,498 B1
(45) Date of Patent: Oct. 20, 2009

(54) CARRIER RECOVERY IN A COHERENT OPTICAL RECEIVER

(75) Inventors: Kuang Tsan Wu, Kanata (CA); Han Sun, Nepean (CA); Kim B. Roberts, Nepean (CA); Ruibin Jin, Ottawa (CA); James Harley, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 662 days.

(21) Appl. No.: 11/366,392

(22) Filed: Mar. 3, 2006

Related U.S. Application Data

(60) Provisional application No. 60/728,751, filed on Oct. 21, 2005.

(51) Int. Cl.
*H04B 10/00* (2006.01)
(52) U.S. Cl. .................. 398/152; 398/154; 398/159
(58) Field of Classification Search ................ 398/147, 398/154, 155, 158, 159, 152
See application file for complete search history.

(56) References Cited

U.S. PATENT DOCUMENTS

| | | | |
|---|---|---|---|
| 4,506,388 A | 3/1985 | Monerie et al. | |
| 4,720,827 A | 1/1988 | Kanaji | |
| 4,723,316 A | 2/1988 | Glance | |
| 4,965,858 A | 10/1990 | Naito et al. | |
| 5,457,563 A | 10/1995 | Van Deventer | |
| 5,473,463 A | 12/1995 | Van Deventer | |
| 5,995,512 A | 11/1999 | Pogue et al. | |
| 6,473,222 B2 | 10/2002 | Hait et al. | |
| 6,607,311 B1 | 8/2003 | Fishman et al. | |
| 6,782,211 B1 | 8/2004 | Core | |
| 2002/0012152 A1 | 1/2002 | Agazzi et al. | |
| 2002/0186435 A1 | 12/2002 | Shpantzer et al. | |
| 2003/0063285 A1 | 4/2003 | Pering et al. | |
| 2003/0123884 A1 | 7/2003 | Willner et al. | |
| 2003/0175034 A1 | 9/2003 | Noe | |
| 2004/0114939 A1 | 6/2004 | Taylor | |
| 2005/0196176 A1* | 9/2005 | Sun et al. .................... 398/152 | |

FOREIGN PATENT DOCUMENTS

| | | |
|---|---|---|
| EP | 1453239 A1 | 9/2004 |
| GB | 2214381 A | 8/1989 |
| WO | WO 00/60776 A1 | 10/2000 |

(Continued)

OTHER PUBLICATIONS

Isaac Shpantzer, Ph.D., "A New Generation of Coherent ULH Fiber-Optic Communication", CeLight Inc., 40 G Workshop, OECC-2002 Conference, Yokohama, Japan, Jul. 8, 2002, pp. 1-14.

(Continued)

*Primary Examiner*—M. R. Sedighian
(74) *Attorney, Agent, or Firm*—Kent Daniels; Blake, Cassels & Graydon LLP

(57) ABSTRACT

A method of carrier recovery from a high speed optical signal received through an optical communications network. A stream of multi-bit digital samples of the optical signal is processed to generate a multi-bit estimate X'(n) of each one of a plurality of transmitted symbols. A phase of each symbol estimate X'(n) is rotated, and a respective symbol phase error $\Delta\phi(n)$ of the rotated symbol estimate determined.

22 Claims, 13 Drawing Sheets

FOREIGN PATENT DOCUMENTS

WO        WO 02/27994 A1    4/2002

OTHER PUBLICATIONS

Isaac Shpantzer, Ph.D. et al., "Coherent Optical Fiber Communication Architecture, Modeling and Optimization", CeLight Inc., SCEE 2002 Conference, Eindhoven, The Netherlands, Jun. 25, 2002, pp. 1-39.

M. Tseytlin et al., "Digital, endless polarization control for polarization multiplexed fiber-optic communications", CeLight Inc., OFC 2003, Mar. 24, 2003, pp. 1-14.

International Search Report for applicant's related International PCT Application PCT/CA2006/001458, Sep. 5, 2006.

International Search Report for applicant's related International PCT Application PCT/CA2006/001459, Sep. 5, 2006.

International Search Report for applicant's related International PCT Application PCT/CA2006/001460, Sep. 5, 2006.

Richard A. Linke, et al., "High-Capacity Coherent Lightwave Systems", Journal of Lightwave Technology, vol. 6, No. 11, Nov. 1988, pp. 1750-1769.

Chul-Ho Shin, et al., "Heterodyne Optical Phase-Locked Loop by Confocal Fabry-Perot Cavity Coupled AlGaAs Laser", IEEE Photonoics Technology Letters, vol. 2, No. 4, Apr. 1990, pp. 297-300.

D.-S. Ly-Gagnon, et al., "Coherent Detection of Optical Quadrature Phase-Shift Keying Signals with Carrier Phase Estimation", Journal of Lightwave Technology, vol. 24, No. 1, Jan. 2006, pp. 12-21.

Frowin Derr, "Coherent Optical QPSK Intradyne System: Concept and Digital Receiver Realization", Journal of Lightwave Technology, vol. 10, No. 9, Sep. 1992, pp. 1290-1296.

D.-S. Ly-Gagnon, et al., "Unrepeatered optical transmission of 20 Gbit/s quadrature phase-shift keying signals over 210 km using homodyne phase-diversity receiver and digital signal processing", Electronics Letters, vol. 41, No. 4, Feb. 17, 2005, pp. 1-2.

Y. Cia, et al., "On Performance of Coherent Phase-Shift-Keying Modulation in 40 Gb/s Long-Haul Optical Fiber Transmission Systems", OFC, Mar. 2006, pp. 1-3.

Matthias Seimetz, "Performance of Coherent Optical Square-16-QAM-Systems based on IQ-Transmitters and Homodyne Receivers with Digital Phase Estimation", OFC, Mar. 2006, pp. 1-10.

U. Koc, et al., Digital Coherent Phase-Shift-Keying (QPSK), OFC, Mar. 2006, pp. 1-3.

Satoshi Tsukamoto, et al., "Coherent Demodulation of Optical 8-Phase Shift-Keying Signals Using Homodyne Detection and Digital Signal Processing", OFC, Mar. 2006, pp. 1-3.

Kazuro Kikuchi, "Coherent Detection of Phase-Shift Keying Signals Using Digital Carrier-Phase Estimation", OFC, Mar. 2006, pp. 1-3.

B. Spinnler, "Chromatic Dispersion Tolerance of Coherent Optical Communications Systems With Electrical Equalization", OFC, Mar. 2006, pp. 1-3.

R.I. Killey, et al., "Electronic dispersion compensation by signal predistortion", OFC, Mar. 2006, pp. 1-3.

Satoshi Tsukamoto, et al., "Unrepeated 20-Gbit/s QPSK Tansmission over 200-km Standard Single-Mode Fiber Using Homodyne Detection and Digital Signal Processing for Dispersion Compensation", OFC, Mar. 2006, pp. 1-3.

S. Calabro, et al., "An electrical polarization-state controller and demultiplexer for polarization multiplexed optical signals", ECOC-IOOC, Sep. 2003, pp. 1-2.

Reinhold Noe, "Phase Noise-Tolerant Synchronous QPSK/BPSK Baseband-Type Intradyne Receiver Concept With Feedforward Carrier Recovery", Journal of Lightwave Technology, vol. 23, No. 2, Feb. 2005, pp. 802-808.

Reinhold Noe, "PLL-Free Synchronous QPSK Polarization Multiplex/Diversity Receiver Concept With Digital I&Q Baseband Processing", IEEE Photonics Technology Letters, vol. 17, No. 4, Apr. 2005, pp. 887-889.

Ezra Ip, et al., "Carrier Synchronization for 3-and 4-bit-per-Symbol Optical Transmission", Journal of Lightwave Technology, vol. 23, No. 12, Dec. 2005, pp. 4110-4124.

Yan Han, et al., "Coherent optical communication using polarization multiple-input-multiple-output", Optics Express, vol. 13, No. 19, Sep. 19, 2005, pp. 7527-7534.

L.E. Franks, "Carrier and Bit Synchronization in Data Communication-A Tutorial Review", IEEE Transactions on Communications, vol. COM-28, No. 8, Aug. 1980, pp. 1107-1121.

M. Cavallari, et al., "Electronic Signal Processing for Differential Phase Modulation Formats", OFC 2004, pp. 1-3.

A. Farbert, et al., "Performance of a 10.7 Gb/s Receiver with Digital Equaliser using Maximum Likelihood Sequence Estimation", ECOC 2004, Proceedings PD-Th4.1.5, Stockholm, pp. 1-2.

Yusuke Ota, et al., "High-Speed, Burst-Mode, Packet-Capable Optical Receiver and Instantaneous Clock Recovery for Optical Bus Opearation", Journal of Lightwave Technology, vol. 12, No. 2, Feb. 1994, pp. 325-331.

\* cited by examiner

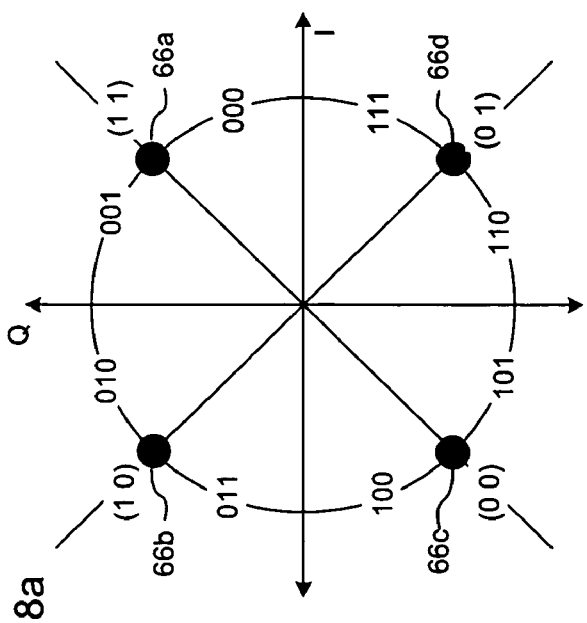

CARRIER RECOVERY IN A COHERENT OPTICAL RECEIVER

CROSS-REFERENCE TO RELATED APPLICATIONS

This application claims benefit under 35 U.S.C. 119(e) from U.S. Provisional Patent Application Ser. No. 60/728,751, entitled Automatic Gain Control, which was filed on Oct. 21, 2005.

TECHNICAL FIELD

The present invention relates to optical communications networks, and in particular to methods and systems for carrier recovery in a coherent optical receiver.

BACKGROUND OF THE INVENTION

In the optical communications space, techniques used to detect data modulated onto an optical signal may be broadly grouped into two classes, namely "direct" detection and "coherent" detection. In "direct" detection techniques, the optical signal is made incident on a photodetector. The electrical current appearing at the photodetector output is proportional to the optical power. Data modulated onto the optical signal power using an amplitude-modulation scheme, such as On-Off Keying (OOK) can thus be detected by analysis of the photodetector output current. Direct detection techniques have advantages in terms of low cost, and high reliability for On-Off Keying (OOK) based modulation schemes. As a result, the majority of optical receivers currently used in optical communications networks are based on direct detection.

In "coherent" detection techniques, the optical signal is mixed with a strong, narrow-line-width, local oscillator signal by an optical hybrid, and the combined signal made incident on one or more photodetectors. In some systems, the inbound optical signal is first split into orthogonal polarizations, and each polarization processed by a respective optical hybrid. In-phase and Quadrature components of each polarization can be detected using respective photodetectors positioned to receive corresponding signals output by the optical hybrid. The frequency spectrum of the electrical current appearing at the photodetector output(s) is substantially proportional to the convolution of the received optical signal and the local oscillator, and contains a signal component lying at an intermediate frequency that contains the data. Consequently, this "data component" can be isolated and detected by electronically filtering and processing the photodetector output current.

Coherent detection receivers offer numerous advantages over direct detection receivers, many of which follow from the fact that coherent detection techniques provide both phase and amplitude information of the optical signal. As such, more robust modulation schemes, such as binary phase shift keying (BPSK), quadrature phase shift keying (QPSK), and quadrature amplitude modulation (QAM) can be used.

However, receivers based on coherent detection techniques have suffered disadvantages that have, to date, prevented successful deployment in "real-world" installed communications networks. In particular, both the transmitted carrier signal and the local oscillator signal are generated by respective Tx and LO lasers, which, in the case of "real world" network systems, will be semi-conductor laser. As is well known in the art, such lasers exhibit a finite line width and non-zero phase noise. Semiconductor lasers typically used in optical communications system are governed by a control loop which maintains a desired average laser output frequency. However, frequency transients as high as ±400 MHz at rates of up to 50 kHz are common. In addition, many such lasers often exhibit a maximum line width tolerance of about ±2 MHz. As a result, even when the Tx and LO lasers are operating at nominally the same frequency, a mismatch or offset of as much as ±4 MHz can still exist. Short period phase noise in both of the Tx and LO lasers may significantly increase the frequency mismatch beyond this amount.

In a coherent receiver, a frequency mismatch between the received carrier (that is, the Tx laser) and the LO appears as a time varying phase error of detected symbols. When the phase error reaches $\pi/4$ for QPSK or $\pi/2$ for BPSK, a "cycle-slip" can occur, in which symbols can be erroneously interpreted as lying in an adjacent quadrant. This can result in the erroneous interpretation of every symbol (and thus all data) following the cycle-slip. Accordingly, it is desirable to be able to track and compensate the frequency offset between the Tx carrier and LO signal frequencies. A carrier recovery circuit capable of generating the required carrier error signal, even for BPSK/QPSK signals in which the carrier is suppressed, is described in "Phase Noise-Tolerant Synchronous QPSK/BPSK Baseband-Type Intradyne Receiver Concept With Feedforward Carrier Recovery", R Noé, Journal of Lightwave Technology, Vol. 23, No. 2, February 2005, and illustrated in FIG. 1.

As may be seen in FIG. 1, an optical signal received through an optical link 2 is divided by a polarization beam splitter 4 into orthogonal polarizations (nominally referred to as X and Y polarizations in FIG. 1), which are then mixed with a local oscillator (LO) 6 through a quadrature 90° optical hybrid 8. The composite optical signals appearing at the output of the hybrid 8 are made incident on a set of photodetectors 10 to generate analog electrical signals Re(X), Im(X), Re(Y), Im(Y) respectively corresponding to real (Re) and imaginary (Im) parts of each polarization. The analog polarization signals $\underline{X}$ (=Re(X)+jIm(X)) and $\underline{Y}$ (=Re(Y)+jRe(Y)) are then supplied to a respective analog carrier recovery circuit 12. For simplicity of illustration, only the carrier recovery circuit 12 for the X-polarization is shown in FIG. 1, it being understood that the carrier recovery circuit for the Y-polarization is substantially identical. As may be seen in FIG. 1, the carrier recovery circuit 12 utilizes cascaded frequency doublers 14 (such as Gilbert multiplier cells) which increase the X-polarization frequency by a factor of four. A filter 16 is used to remove broadband noise, and cascaded regenerative frequency dividers 18 used to divide the frequency of the filtered signal by four to obtain a complex recovered carrier signal C*, which is then mixed (at 20) with the complex polarization signal $\underline{X}$ to obtain the complex baseband signal D.

It is important to note that the X and Y polarizations in Noé are the received polarizations. These do not in general match the transmitted polarizations due to the polarization dynamics of the fiber.

A limitation of this arrangement is that the analog carrier recovery circuit 12 is an inherently narrow-band device. In particular, the Intermediate Frequency (IF) linewidth of the carrier recovery circuit 12 is proportional to the bit error rate (BER): increasing the IF linewidth increases the frequency mis-match that can be corrected by the carrier recovery circuit 12, but at a cost of increasing the BER of the baseband signal D. The moderate-to-severe impairments (e.g. chromatic dispersion, Inter-Symbol Interference-ISI, Polarization Dependent Loss-PDL, Polarization Mode Dispersion-PMD, etc.) encountered in "real-world" installed networks compound this difficulty. Even without an impaired optical signal, Noé's experimental results suggest that in order to achieve an industry-standard $10^{-9}$ BER, the maximum permissible IF linewidth would have to be on the order of 1.8 MHz (for a 10 Gbaud QPSK single-polarization system). Such a low IF linewidth necessitates the use of high-precision lasers having a line width of ≦1 MHz, and extremely low transient excursions from the desired frequency. Such lasers are very expensive, and thus are not normally used in communications systems. Clearly, the methods of Noécannot be use with semiconductor lasers of the type commonly used in communications networks, having a line width on the order of ±2 MHz and frequency transients of ±400 MHz.

An additional limitation of Noé's system is that analog circuits are notoriously well known for their inability to adapt to changes following manufacture. At best, the analog carrier recovery circuit of Noé may be able to compensate for performance drift due to component heating, and possibly aging effects. However, a carrier recovery circuit optimized for 10 Gbaud single-polarization signals will not be able to accommodate a polarization-multiplexed 40 GBaud signal.

Accordingly, methods and techniques that enable carrier recovery in a receiver unit of an optical network remain highly desirable.

SUMMARY OF THE INVENTION

An object of the present invention is to provide methods and techniques that enable carrier recovery in a receiver unit of an optical network.

Thus, an aspect of the present invention provides a method of carrier recovery from a high speed optical signal received through an optical communications network. A stream of multi-bit digital samples of the optical signal is processed to generate a multi-bit estimate X'(n) of each one of a plurality of transmitted symbols. A phase of each symbol estimate X'(n) is rotated, and a respective symbol phase error Δϕ(n) of the rotated symbol estimate determined.

BRIEF DESCRIPTION OF THE DRAWINGS

Further features and advantages of the present invention will become apparent from the following detailed description, taken in combination with the appended drawings, in which:

FIGS. 8a and 8b are charts illustrating operation of the decision circuit of FIG. 7 for the case of QPSK signals;

FIGS. 9a and 9b are charts illustrate operation of the combiner of FIG. 7 for the case of dual and single polarization optical signals;

It will be noted that throughout the appended drawings, like features are identified by like reference numerals.

DETAILED DESCRIPTION OF THE PREFERRED EMBODIMENT

The present invention provides methods and techniques that enable carrier recovery in a receiver unit of an optical network. Embodiments of the present invention are described below, by way of example only, with reference to FIGS. 2-13b.

Figure 1:
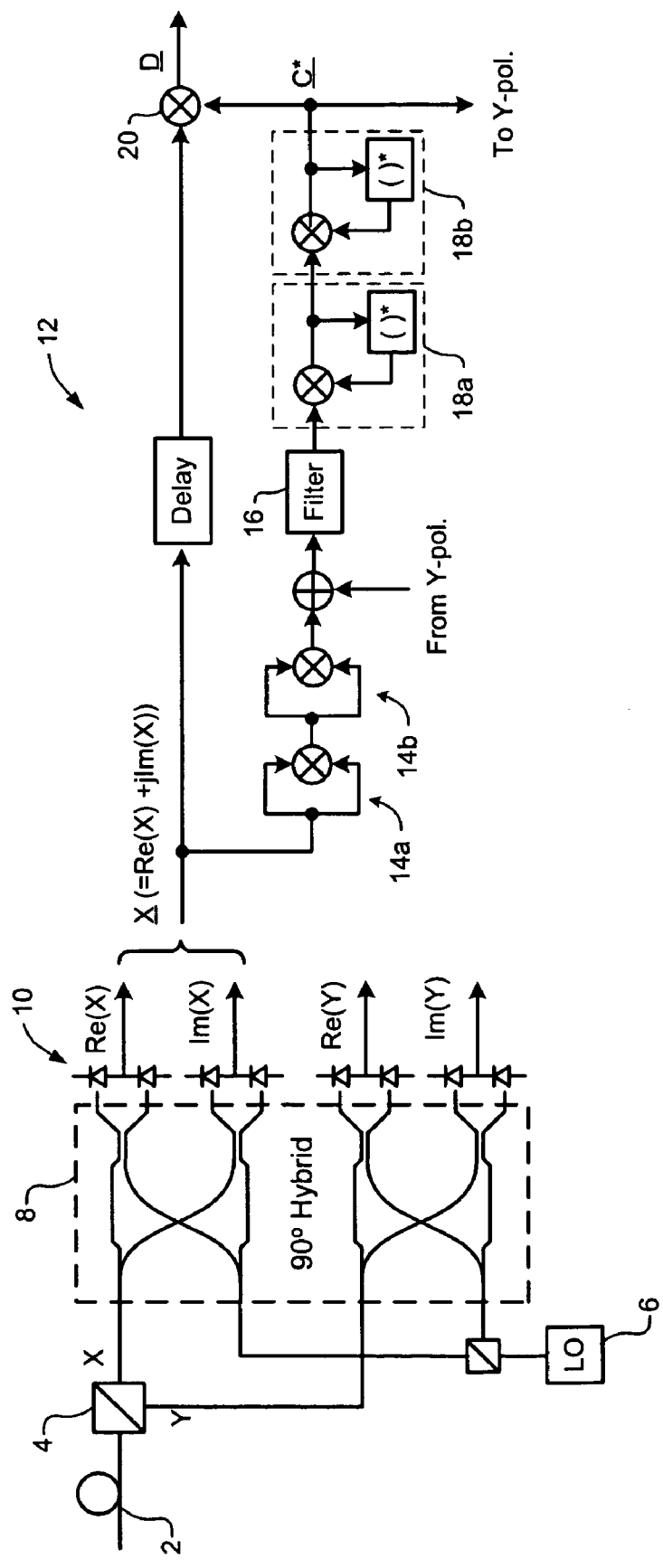
FIG. 1 is a block diagram schematically illustrating principal elements of a coherent optical receiver including a carrier recovery circuit known from known in the prior art.
Figure 2:
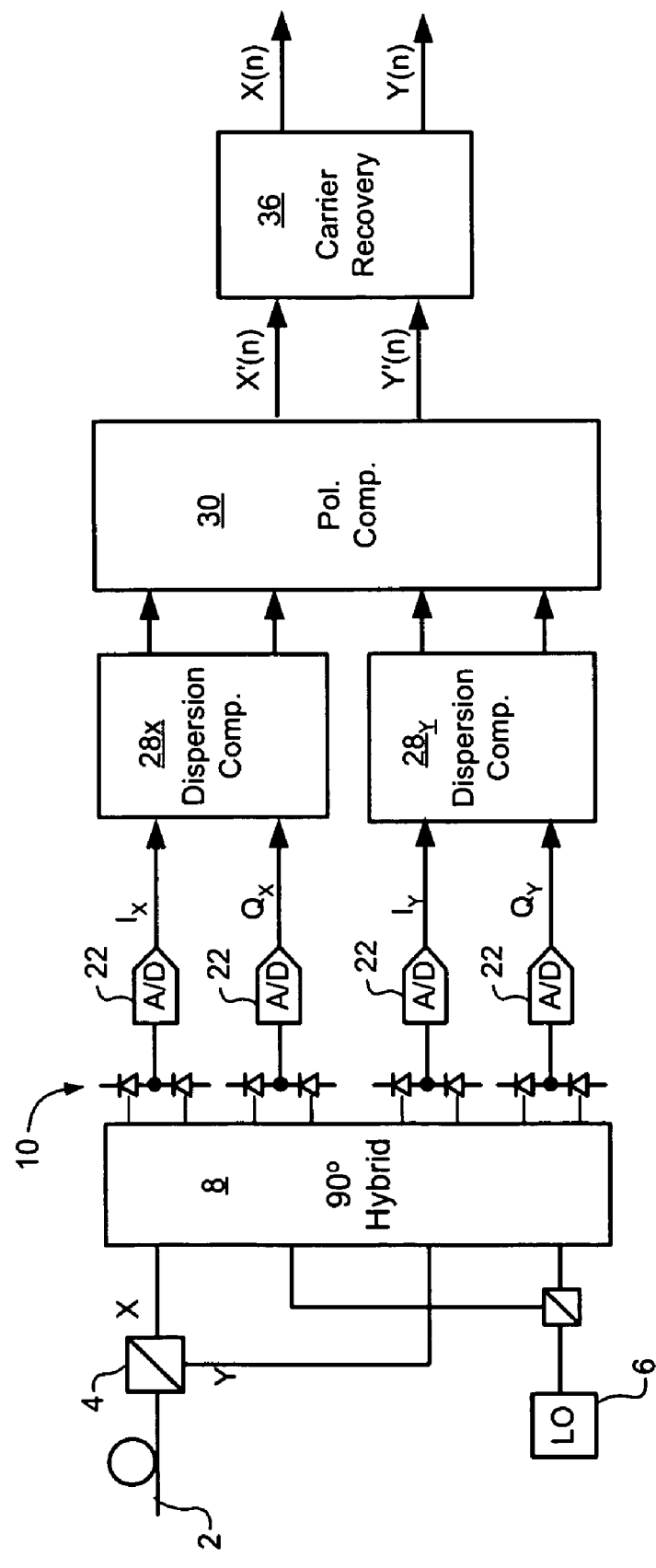
FIG. 2 is a block diagram schematically illustrating principal elements and operations of a coherent optical receiver in which a carrier recovery circuit in accordance with the present invention may be implemented.

In general, the present invention provides a system in which carrier recovery is performed in the digital domain, downstream of digital chromatic dispersion and polarization compensation functions. FIG. 2 schematically illustrates a representative coherent optical receiver in which digital carrier recovery can be employed.

In the coherent optical receiver of FIG. 2, an inbound optical signal is received through an optical link 2, split into orthogonal polarizations by a Polarization Beam Splitter 4, and then mixed with a Local Oscillator (LO) signal 6 by a conventional 90° hybrid 8. The composite optical signals emerging from the optical hybrid 8 are supplied to respective photodetectors 10, which generate corresponding analog signals. The analog photodetector signals are sampled by respective Analog-to-Digital (A/D) converters 22 to yield multi-bit digital sample streams corresponding to In-phase (I) and Quadrature (Q) components of each of the received polarizations. Although two photodetectors 10 are shown for each A/D 22 in FIG. 2, in some embodiments only one photodetector 10 can used for each A/D converter 22 with satisfactory performance.

As may be appreciated, the resolution of the A/D converters 22 is a balance between performance and cost. Increasing the resolution improves sampling accuracy, and thereby improves the extent to which signal distortions can be corrected by downstream dispersion and polarization compensators as well as the accuracy of carrier recovery. However, this increased accuracy is obtained at a cost of increased complexity, silicon area and heat generation. It has been found that a resolution of less than 4 bits is insufficient for satisfactory dispersion and polarization compensation. In practice, a resolution of between 5 and 8 bits provides satisfactory performance, at an acceptable cost.

Figure 3A:
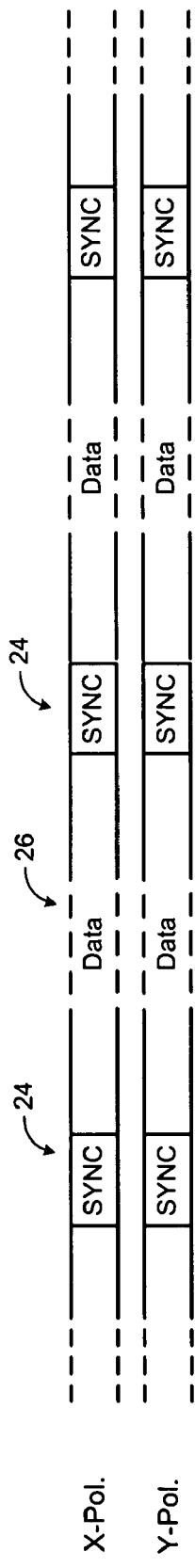
FIGS. 3a and 3b schematically illustrate respective different optical signals formats usable in the coherent optical receiver of FIG. 2.
Figure 3B:
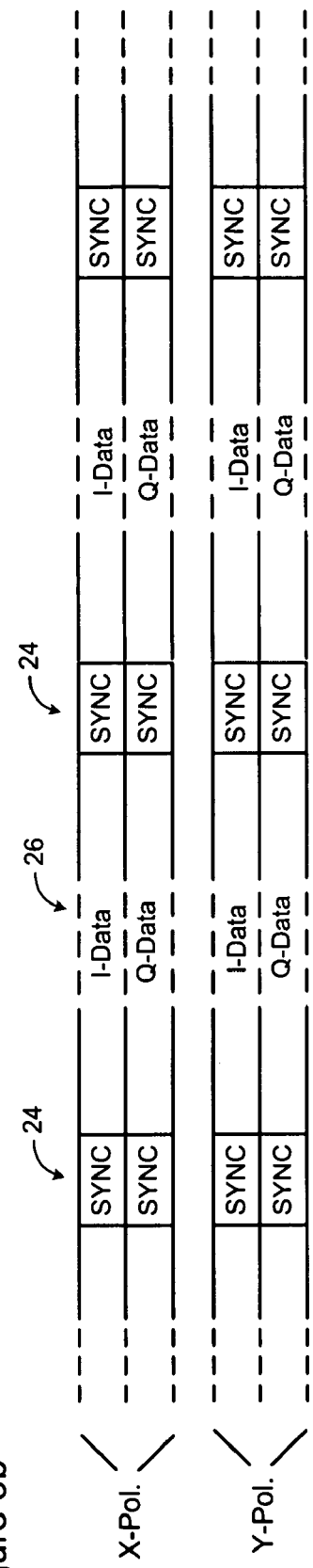

FIGS. 3a and 3b illustrate representative optical signal formats which may be used in conjunction with embodiments of the present invention. In each of the illustrated embodiments, the optical signal includes nominally regularly spaced SYNC bursts 24 embedded within a stream of data symbols 26. Each SYNC burst 24 has a respective predetermined symbol (or, equivalently, bit) sequence on each transmitted polarization. The symbol (bit) sequences of each polarization are preferably transmitted simultaneously, but this is not necessary. In the embodiment of FIG. 3a, two orthogonal bit sequences are used in each SYNC burst 24; each bit sequence being assigned to a respective transmitted polarization. FIG. 3b illustrates an alternative arrangement, in which each of the I and Q components of each transmitted polarization is assigned a respective orthogonal bit sequence. It should be noted that the signal formats illustrated in FIGS. 3a and 3b represent signal formats at the transmitter end of the link. As described above, impairments of the optical link distort the transmitted signal such that the received polarizations will tend to be neither orthogonal nor aligned with the polarization beam splitter 4.

Returning to FIG. 2, from the A/D converter 22 block, the I and Q sample streams of each received polarization are supplied to a respective dispersion compensator 28, which operates on the sample stream(s) to compensate chromatic dispersion. Various methods are known for performing this function, such as, for example Finite Impulse Response (FIR) filters.

Figure 4:
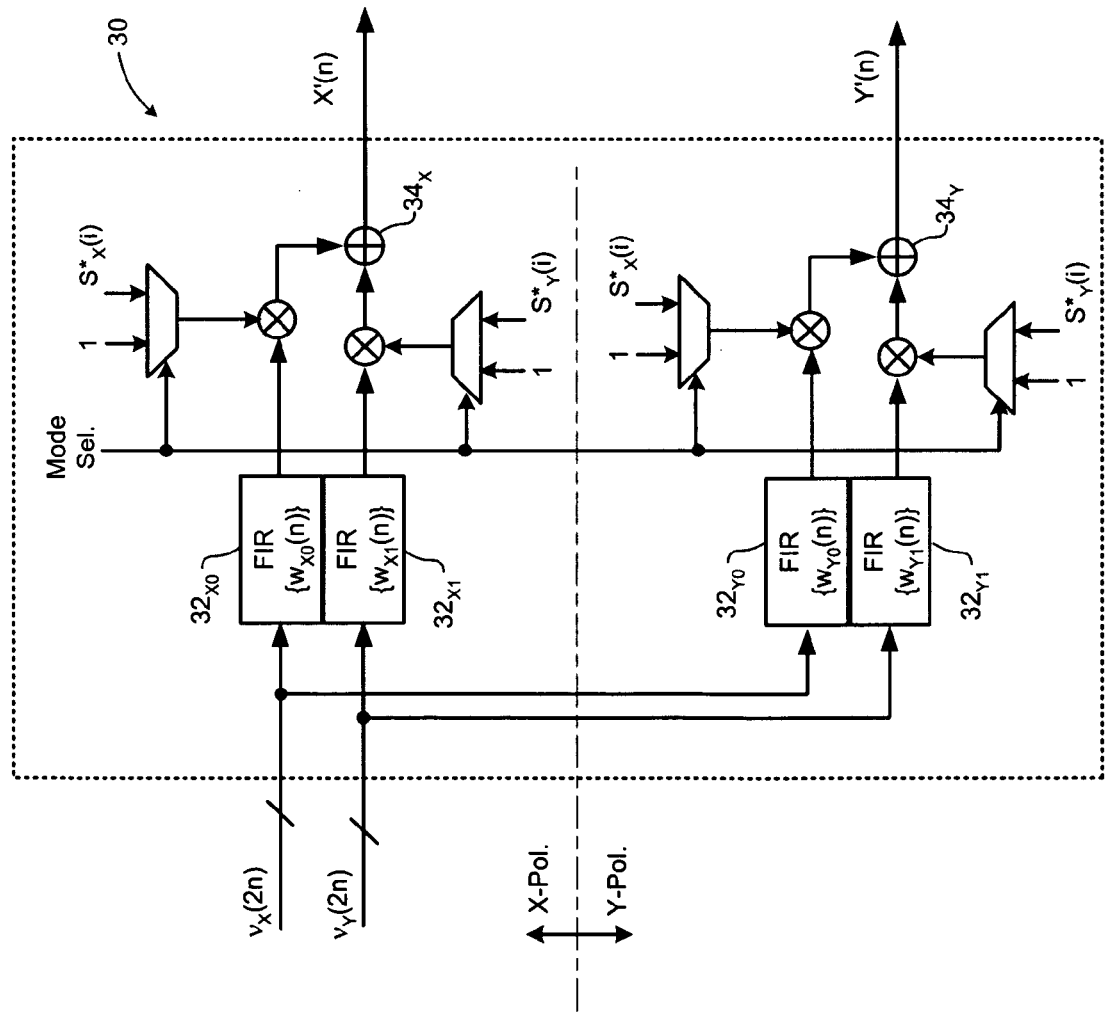
FIG. 4 is a is a block diagram schematically illustrating principal elements and operations of a polarization compensator usable in the coherent optical receiver of FIG. 2.

The dispersion-compensated sample streams appearing at the output of the dispersion compensators 28 are then supplied to a polarization compensator 30 which operates to compensate polarization effects, and thereby de-convolve transmitted symbols from the complex sample streams output from the dispersion compensators 28. If desired, the polarization compensator 30 may operate as described in Applicant's co-pending U.S. patent application Ser. No. 11/294,613 filed Dec. 6, 2005. Thus, for example, the polarization compensator 30 may be configured as a Finite Impulse Response (FIR) filter which implements an Inverse Jones matrix. In the embodiment of FIG. 4, the polarization compensator 30 is provided as a pair of Finite Impulse Response (FIR) filters 32 for each transmitted polarization. Each FIR filter 32 is loaded with respective complex tap weights $\omega_{X0}$(n), $\omega_{X1}$(n), $\omega_{Y0}$(n), and $\omega_{Y1}$(n) which may be computed as described in Applicant's co-pending U.S. patent application Ser. No. 11/294,613.

In the embodiment of FIG. 4, the dispersion compensators $28_X$ and $28_Y$, generate respective complex sample streams $v_X(m)$ and $v_Y(m)$, where m is an index of each successive sample v. Each sample stream $v_X(m)$ and $v_Y(m)$ includes respective dispersion compensated I and Q components of the corresponding received polarization, and has a sample rate of about double the symbol rate to satisfy the Nyquist criterion.

In a Training mode of the receiver, the output of each FIR filter 32 is multiplied by the conjugate of the known SYNC symbols $S_X(i)$ and $S_Y(i)$, and summed (at 34) to compute respective correlations between the dispersion compensated samples of the SYNC burst 24 and the known SYNC symbols. On the other hand, in a data detection mode of the receiver, the FIR outputs are summed (at 34) to generate multi-bit symbol estimates X'(n) and Y'(n) containing both amplitude and phase information of each transmitted symbol. In some embodiments, the symbol estimates X'(n) and Y'(n) are 10-bit digital values, comprising 5-bits for each of the real and imaginary parts. These estimated symbol values include phase error due to the frequency offset between the Tx and LO frequencies, laser line width and phase noise.

Figure 5:
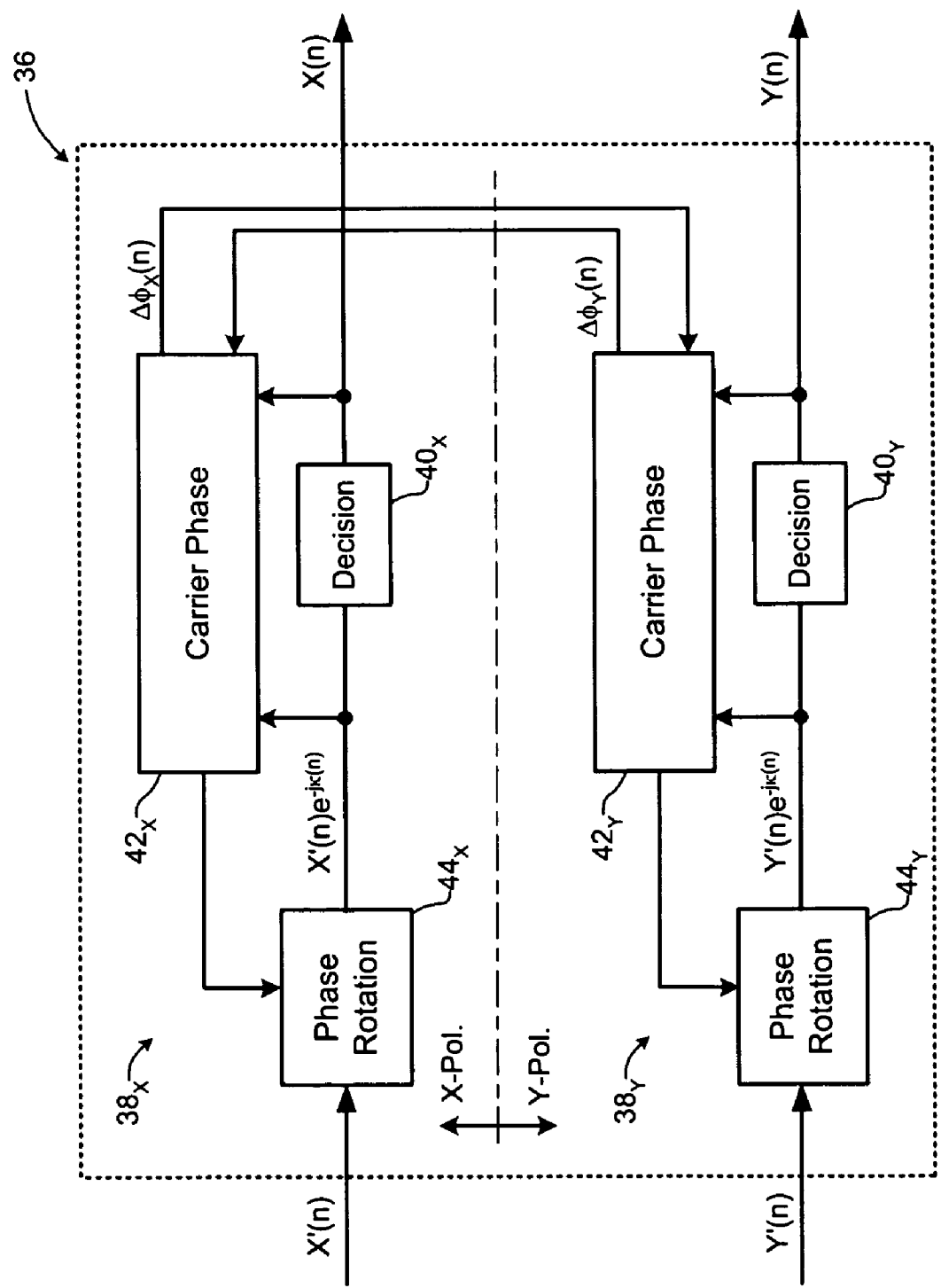
FIG. 5 is a block diagram schematically illustrating principal elements and operations of a carrier recovery block in accordance with a first representative embodiment of the present invention.

The polarization compensator 30 outputs are then supplied to a carrier recovery block 36 (see FIG. 2), which performs carrier recovery and phase error correction, and symbol determination. FIG. 5 schematically illustrates a representative carrier recovery block 36 which performs these operations.

In the embodiment of FIG. 5, the carrier recovery block 36 is divided into two substantially identical processing paths 38; one for each transmitted polarization. Each processing path 38 receives a respective output of the polarization compensator 30, and outputs recovered symbols of its respective transmitted polarization. Each processing path 38 includes a decision circuit 40 and a carrier recovery loop comprising a carrier phase detector 42 and a phase rotator 44. In general, the phase rotators 44 use a carrier phase estimate generated by the respective carrier phase detector 42 to compute and apply a phase rotation κ(n) to the symbol estimates X'(n) and Y'(n) received from the polarization compensator 30. The decision circuits 40 use the phase-rotated symbol estimates X'(n)$e^{-j\kappa(n)}$ and Y'(n)$e^{-j\kappa(n)}$ to generate the recovered symbol values X(n) and Y(n), and the phase detectors 42 operate to detect respective phase errors Δφ between the rotated symbol estimates X'(n)$e^{-j\kappa(n)}$ and Y'(n)$e^{-j\kappa(n)}$ and the corresponding recovered symbol values X(n) and Y(n). Embodiments of each of these blocks will be described in greater detail below.

Figure 6:
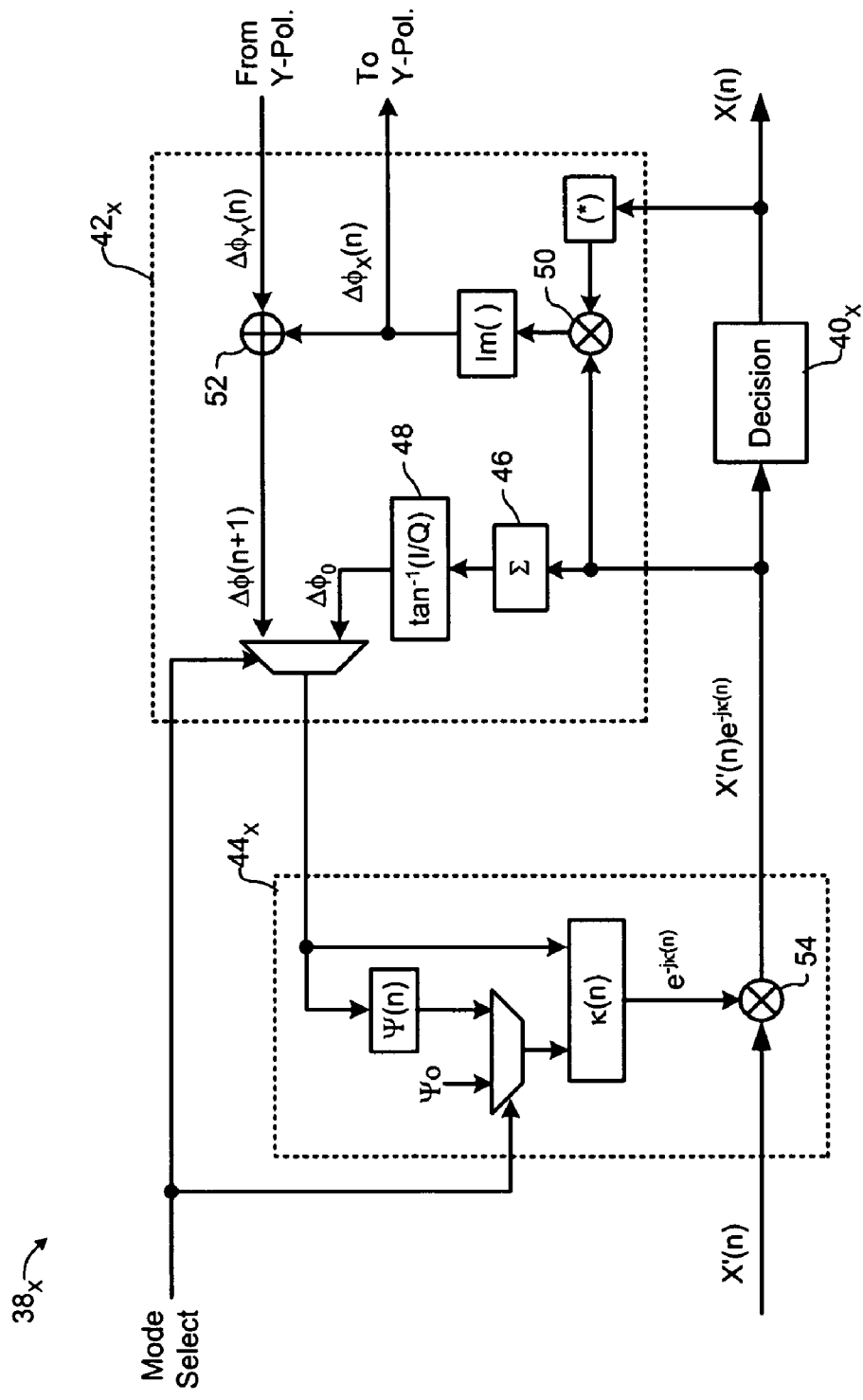
FIG. 6 is a block diagram schematically illustrating the carrier recovery block of FIG. 5 in greater detail.

FIG. 6 schematically illustrates the carrier recovery block 36 of FIG. 5 in greater detail. It will be noted that only the X-Polarization processing path $38_X$ is illustrated in FIG. 6, it being understood that substantially identical circuitry will be provided for the Y-Polarization. The carrier recovery 36 block of FIG. 6 is configured for two operating modes, namely: a "training" mode while processing a SYNC burst 24; and a "data detection" mode while recovering transmitted data symbols 26. In the training mode, the correlation values output by the polarization compensator 30 are rotated in accordance with an initial frequency offset parameter $\psi_0$, which preferably corresponds with the frequency offset parameter $\psi(N)$ computed at the end of the previous block of data symbols 26. The rotated correlation values are then accumulated (at 46) to average the correlation across at least a portion of the SYNC burst 24. The I and Q components of the averaged correlation value are then used to compute an initial symbol phase estimate $$\Delta \phi_0 = \tan^{-1}\left(\frac{Q}{I}\right)$$

at 48 which is then used for the start of data detection. If desired, the inverse-tangent computation may be performed using a look-up table.

Once the SYNC symbols 24 have been processed, the receiver switches to the data correction mode, during which the symbol phase error Δφ is updated at the symbol rate and used for rotating the phase of each successive data symbol estimate. This operation will be described in greater detail below.

In general, the carrier detector loop computes the phase rotation κ(n) which compensates phase errors of the symbol estimates X'(n) and Y'(n). In the illustrated embodiments, this is accomplished by implementing first and second order carrier detector functions. Thus, for example, each successive value of the phase rotation κ(n) may be computed using a function of the form:

κ(n+1)=κ(n)+μ$_1$Δφ(n+1)+μ$_1$Ψ(n+1);

where: the first-order term μ$_1$Δφ(n+1) relates to the phase difference between the rotated symbol estimate and the corresponding recovered symbol; and the second order term μ$_2$Ψ(n+1) is derived from a frequency offset parameter ψ(n) which models the frequency offset or mismatch Δf between the Tx and LO lasers. As will be appreciated, the first order term will vary from symbol-to-symbol, and therefore reflects the effects of phase noise of the Tx and LO lasers. As will be described in greater detail below, the second order term integrates phase differences over time, and thus is a comparatively slow-varying value which follows laser frequency excursions but is otherwise insensitive to phase noise. The scaling factors $\mu_1$ and $\mu_2$ may be programmable, and define the respective phase adjustment step size for each term.

In the embodiment of FIG. 6, the symbol phase difference $\Delta\phi(n+1)$ is computed using a simplified Least Mean Squares (LMS) algorithm. Thus, the carrier phase detector 42 multiplies the rotated symbol estimate $X'(n)e^{-j\kappa(n)}$ and the conjugate of the corresponding recovered symbol value $X(n)$ (at 50) to obtain a multi-bit correlation value. The imaginary part of this multi-bit correlation value represents the phase error $\Delta\phi_X(n)=\text{Im}\{X'(n)e^{-j\kappa(n)}\cdot X^*(n)\}$ between the estimated and actual symbol phase. Adding the corresponding phase error $\Delta\phi_Y(n)=\text{Im}\{Y'(n)e^{-j\kappa(n)}\cdot Y^*(n)\}$ computed for the Y-polarization (at 52) yields a symbol phase error $\Delta\phi(n+1)$ with an improved signal-to-noise ratio.

The phase rotator 44 uses the symbol phase error $\Delta\phi(n+1)$ to compute the frequency offset parameter $\psi(n)$, and finally the total carrier phase error $\kappa(n+1)$. The frequency offset parameter $\psi(n)$, which is proportional to the frequency difference $\Delta f$ between the Tx and LO frequencies, may conveniently be computed by accumulating successive symbol phase error values. Thus $\Psi(n+1)=\Psi(n)+\Delta\phi(n+1)$. Taken together, the first and second order terms $\mu_1\Delta\phi(n+1)$ and $\mu_2\Psi(n+1)$ provide an estimate of the incremental phase change $\Delta\kappa$ between the $n^{th}$ and $(n+1)^{th}$ symbols. Accumulating this incremental value $\Delta\kappa$ for each successive data symbol yields the updated carrier phase estimate $\kappa(n+1)$.

At the completion of each block 26 of data symbols, the final value of the frequency offset parameter $\psi(N)$ can be stored for use as the initial frequency offset parameter $\psi_0$ for the next block of data symbols.

In the embodiment of FIG. 6, rotating the symbol estimates $X'(n)$ and $Y'(n)$ is accomplished by multiplying (at 54) each symbol estimates $X'(n)$ and $Y'(n)$ by $e^{-j\kappa(n)}$. This operation can be assumed to have the effect of rotating the symbol phase into the correct quadrant of the QPSK phase diagram. As a result, a hard decision of the symbol value $X(n)$ can be obtained by selecting the ideal symbol phase and amplitude for the quadrant in which the rotated symbol estimate $X'(n)e^{-j\kappa(n)}$ is located. One method of accomplishing this is by computing the sign of the I and Q components of the rotated symbol estimates $X'(n)e^{-j\kappa(n)}$ and $Y'(n)e^{-j\kappa(n)}$.

Figure 7:
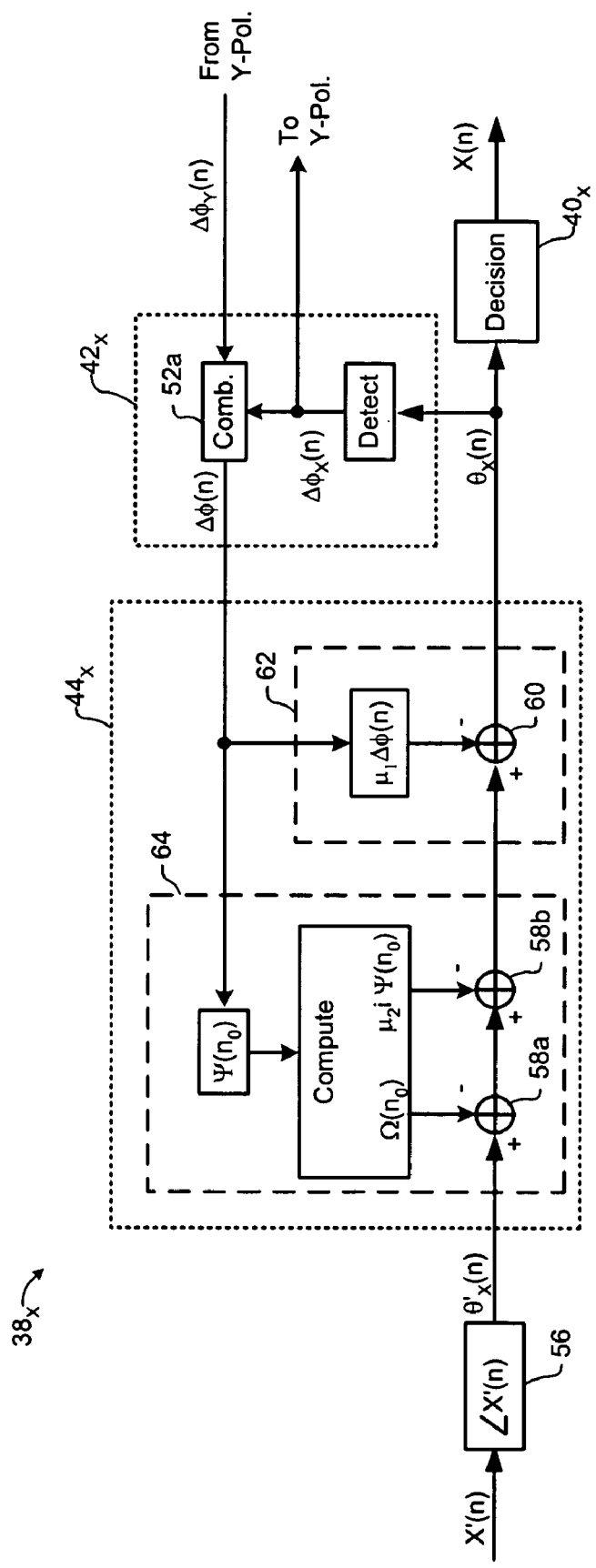
FIG. 7 is a block diagram schematically illustrating an alternative embodiment of the carrier recovery block of FIG. 5.

FIG. 7 illustrates an alternative embodiment in which the phase computations are significantly simplified. The embodiment of FIG. 7 is based on the fact that QPSK/DPSK symbols have a constant amplitude (nominally "1") so that the correct symbol values can be recovered from the symbol estimates $X'(n)$ and $Y'(n)$ by analysing only their phase information. Accordingly, the symbol estimates $X'(n)$ and $Y'(n)$ are analysed (at 56) to determine their respective phase angles $\theta'_X(n)$ and $\theta'_Y(n)$. If desired, this calculation may be performed using a look-up table. With the symbol estimates $X'(n)$ and $Y'(n)$ converted into the phase-domain in this manner, further phase rotations to compensate the total phase error estimate $\kappa(n)$ can be accomplished by simple addition/subtraction blocks 58 and 60. Replacing the multiplication-based phase rotator of FIG. 6 with the addition/subtraction blocks 58 and 60 of FIG. 7 reduces the propagation delay through the carrier recovery block 36, and thereby supports higher-speed optical signals.

In the embodiment of FIG. 7, the rotator 44 comprises first and second order phase rotation blocks 62 and 64. The first order phase rotation block 62 uses each successive symbol phase error $\Delta\phi(n)$ to compute a corresponding first order phase rotation term $\mu_1\Delta\phi(n+1)$ which compensates short-period phase jitter. The scaling factor $\mu_1$ may be selected based on a desired adjustment step size. For example, in an embodiment in which the symbol phase estimate $\theta'(n)$ is a 8-bit digital word, the smallest possible adjustment step size is $$\frac{2\pi}{2^8} = 0.025(\text{rad}) = 1.4°.$$

Larger step sizes can be obtained by suitable selection of the scaling factor $\mu_1$.

The second order phase rotation block 64 operates to compute and apply phase rotations due to the frequency offset $\Delta f$ between the Tx and LO lasers. One way of accomplishing this is to compute the frequency offset parameter $\Psi(n)$ by accumulating successive symbol phase errors, this $\Psi(n+1)=\Psi(n)+\Delta\phi(n+1)$. The frequency offset parameter $\psi(n)$ can be selected to obtain the second order phase rotation $\mu_2\cdot\Psi(n)$. In the embodiment of FIG. 7, however, the second order phase rotation block 64 operates on an update cycle of p (e.g. p=6) symbols. For each symbol $S_i$ ($0\leq i\leq[p-1]$) of each update cycle, the absolute phase due to the frequency offset is computed by adding a starting phase $\Omega(n_0)$ of the update cycle to an incremental phase change for of each successive symbol $S_i$.

The starting phase $\Omega(n_0)$ is simply the accumulated phase angle at the end of the previous update cycle. The incremental phase change for each symbol $S_i$ ($0\leq i\leq[p-1]$) of the update cycle is derived from a frequency offset parameter $\psi(n_0)$ which is computed by summing the symbol phase errors $\Delta\phi(n)$ over the previous update cycle. Thus, $$\Psi(n_0) = \sum_{i=0}^{p-1} \Delta\phi(n-p+i),$$

and the incremental phase change for each symbol $S_i$ of the incremental cycle is $\mu_2 i\cdot\Psi(n_0)$. With this notation, the starting phase $\Omega(n_0)$ of the current update cycle is the total of the incremental phase changes through the previous update cycle, thus $\Omega(n_0)=\Omega(n_0-p)+\mu_2 p\cdot\Psi(n_0-p)$. The scaling factor $\mu_2$ may be a programmable value based on a desired carrier recovery loop bandwidth. In some embodiments $$\mu_2 = \frac{1}{2\pi},$$

may be implemented as $$\mu_2 = \frac{1}{2^8}$$

in cases where the symbol phase estimate $\theta'(n)$ is represented as an 8-bit digital word.

As in the embodiment of FIG. 6, the phase rotations imposed by the rotator block 44 result in the derotated symbol phase estimate $\theta_X(n)=\theta'_X(n)-\Omega(n_0)-\mu_2 i\cdot\Psi(n_0)-\mu_1\Delta\phi(n)$ lying within the correct quadrant of the QPSK/DPSK phase space. For example, FIG. 8a shows the QPSK symbol space using a Cartesian (I-Q) coordinate system. Each of the four QPSK symbol phases are shown at 66, along with their corresponding values. FIG. 8*b* is a chart showing a mapping between the rotated symbol phase estimate $\theta_X(n)$ and the nominal QPSK symbol values, for an embodiment in which $\theta_X(n)$ is represented as an 8-bit digital word. As may be seen in FIG. 8*b*, the 2 most significant bits (MSBs), $b_7$ and $b_6$, remain constant within each quadrant of the QPSK symbol space, and thus fully identify the quadrant within which the symbol estimate lies. As a result, the decision block 40 can be implemented as a look-up table function which receives the two MSBs $b_7$ and $b_6$ as input, and which outputs the nominal QPSK symbol value X(n). The 6 Least Significant Bits (LSBs), $b_5$–$b_0$, relate to discrete phase angles within each quadrant, and thus can be used to compute the symbol phase error $\Delta\phi_X(n)$. One method of doing this is to simply subtract the 6-LSBs $b_5$–$b_0$ of the rotated symbol phase estimate $\theta_X(n)$ from the corresponding 5 LSB's of each QPSK symbol, which are "1 0 0 0 0 0" for all four QPSK symbols. An alternative arrangement is to use a smaller number of these LSBs (e.g. bits $b_5$, $b_4$, $b_3$, $b_2$) to obtain a multi-bit phase error estimate with somewhat lower resolution.

A simplified symbol phase error detection can be performed by recognising that the $3^{rd}$ MSB, $b_5$, indicates the sense of the phase error, that is, whether the rotated phase estimate $\theta_X(n)$ leads or lags the correct symbol phase. As such, the $3^{rd}$ MSB, $b_5$, may be referred to as a state-splitting bit (SSB) and used as a single-bit symbol phase error $\Delta\phi_X(n)$. Combining the corresponding phase errors $\Delta\phi_X(n)$ and $\Delta\phi_Y(n)$ of both polarizations, for example using the look-up table function of FIG. 9*a* yields a 2-bit phase difference $\Delta\phi(n)$ having values (–1, 1, or 0). This value can be used directly by the first order phase rotation block 62 to decrement, increment or none the symbol phase estimate $\theta'_X(n)$ in increments 1.4 degrees per step (in the case of an 8-bit symbol phase estimate).

The foregoing description particularly discusses carrier recovery and symbol detection for the case of QPSK symbols and a dual-polarization (i.e. a polarization multiplexed) optical signal. However, it will be appreciated that the embodiments of FIGS. 5-9*a* can readily be adapted to work with other symbol encoding formats, and single-polarization optical signals, if desired. In particular, for the case of a single polarization optical signal (using any symbol format), only one processing path (e.g. the X-polarization) of the carrier recovery block is needed. In this case, the symbol phase difference (e.g. $\Delta\phi_Y(n)=\text{Im}\{Y'(n)e^{-j\kappa(n)}\cdot Y^*(n)\}$) computed by the unused Y-polarization processing path can be set to zero or otherwise ignored, since it contains no useful information. On way of accomplishing this is to expand the look-up table function of the combiner block 52*a* of FIG. 7, as may be seen in FIG. 9*b*.

Figures 10A, 10B:
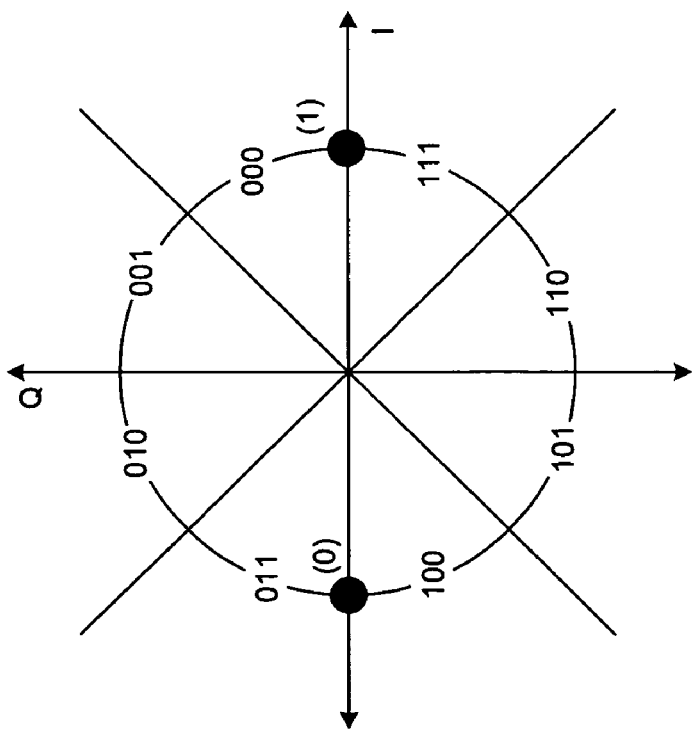
FIGS. 10a and 10b are charts illustrating operation of the decision circuit of FIG. 7 for the case of DPSK signals.

Different signal formats can be handled by suitably selecting the behaviour of the phase detector 42 and decision block 40. For example, in the case of a BPSK signal, both symbols lie on the I-axis (see FIG. 10*a*), and the 2 most significant bits (MSBs), $b_6$ and $b_5$ of the rotated symbol phase estimate $\theta_X(n)$ fully identify the quadrant within which the symbol estimate lies. Accordingly, the decision block look-up table of FIG. 8*b* can be expanded as shown in FIG. 10*b*, to receive the two MSBs $b_6$ and $b_5$ and a format flag as the input, outputs the correct QPSK or DPSK symbol value X(n). In the case of a BPSK signal the 6 Least Significant Bits (LSBs), $b_5$–$b_0$, relate to discrete phase angles within each half of the I-Q phase space. The $2^{nd}$ MSB, $b_5$, indicates the sense of the phase error, that is, whether the rotated symbol phase estimate $\theta_X(n)$ leads or lags the correct symbol phase. Accordingly, the phase detector 42 can select the $2^{nd}$ MSB, $b_5$, as the single-bit symbol phase difference $\Delta\phi_X(n)$. As will be appreciated, this embodiment has an advantage that the carrier recovery block 36 can readily adapt to different optical signal formats (e.g. single or dual polarization) and different encoding schemas (e.g. DPSK and QPSK) merely by setting appropriate state control bits of the receiver.

In the embodiments of FIGS. 6-10, the symbol phase difference $\Delta\phi_X(n)$ is updated at the symbol rate, so that the first order phase rotation term $\mu_1\Delta\phi(n+1)$ tracks and compensates phase jitter at the symbol rate. However, if desired, the symbol phase difference $\Delta\phi_X(n)$ may be accumulated over a selected number of symbols (e.g. 4), and the accumulated value used to determine the first order phase rotation term $\mu_1\Delta\phi(n+1)$. This reduces the rate at which the first-order term can track phase changes, but has an advantage that it enables the bandwidth of the carrier recovery loop to be programmable.

For simplicity of explanation, the methods described above are causal, in that the phase rotation $\kappa(n+1)$ applied to each symbol estimate is a function of only those symbols which precede it in the given direction of processing. For improved performance, the estimation of the phase rotation $\kappa(n+1)$ can be noncausal by being a function of the symbols both before and after the given symbol. One way of implementing such an arrangement is with additional hardware that does preliminary phase estimates for the symbols after the given symbol. These preliminary estimates can be used before the final estimates are determined.

In the embodiments of FIGS. 6 and 7, carrier recovery and symbol phase de-rotation is performed independently for each of the transmitted X and Y polarizations. This solution is feasible because the transmitted polarization are deconvolved from the received polarizations by the polarization compensator, upstream of the carrier recovery block. Joint carrier recovery is desirable when there is sufficient correlation between the phases of the two symbol polarizations. This is accomplished, for example, by averaging the phase estimates from each symbol polarization.

Dispersion in the optical path between transmitter and receiver means that the phase of the received optical signal at a given instant is a function of the phase of many transmitted symbols, those symbols generally having an evolution of transmitted phase noise. Dispersion equalization before carrier recovery removes these effects, eliminates the interference from the symbol patterns, and allows the evolution of the phase noise to be tracked.

The embodiments described above with reference to FIGS. 2-10 provide a single data path through the receiver. As will be appreciated, this requires that the carrier recovery block 36 operate at the full line rate of the optical signal. For the case of a 10 Gbaud optical signal, this means that the carrier recovery block 36 must operate fast enough to process symbols at 10 GHz. In some cases, it may be desirable to divide the data path into a number of parallel paths, which allows at least the carrier recovery and symbol decision operations to be performed at a lower rate. A representative coherent optical receiver implementing such an arrangement is described below with reference to FIGS. 11-13.

Figure 11:
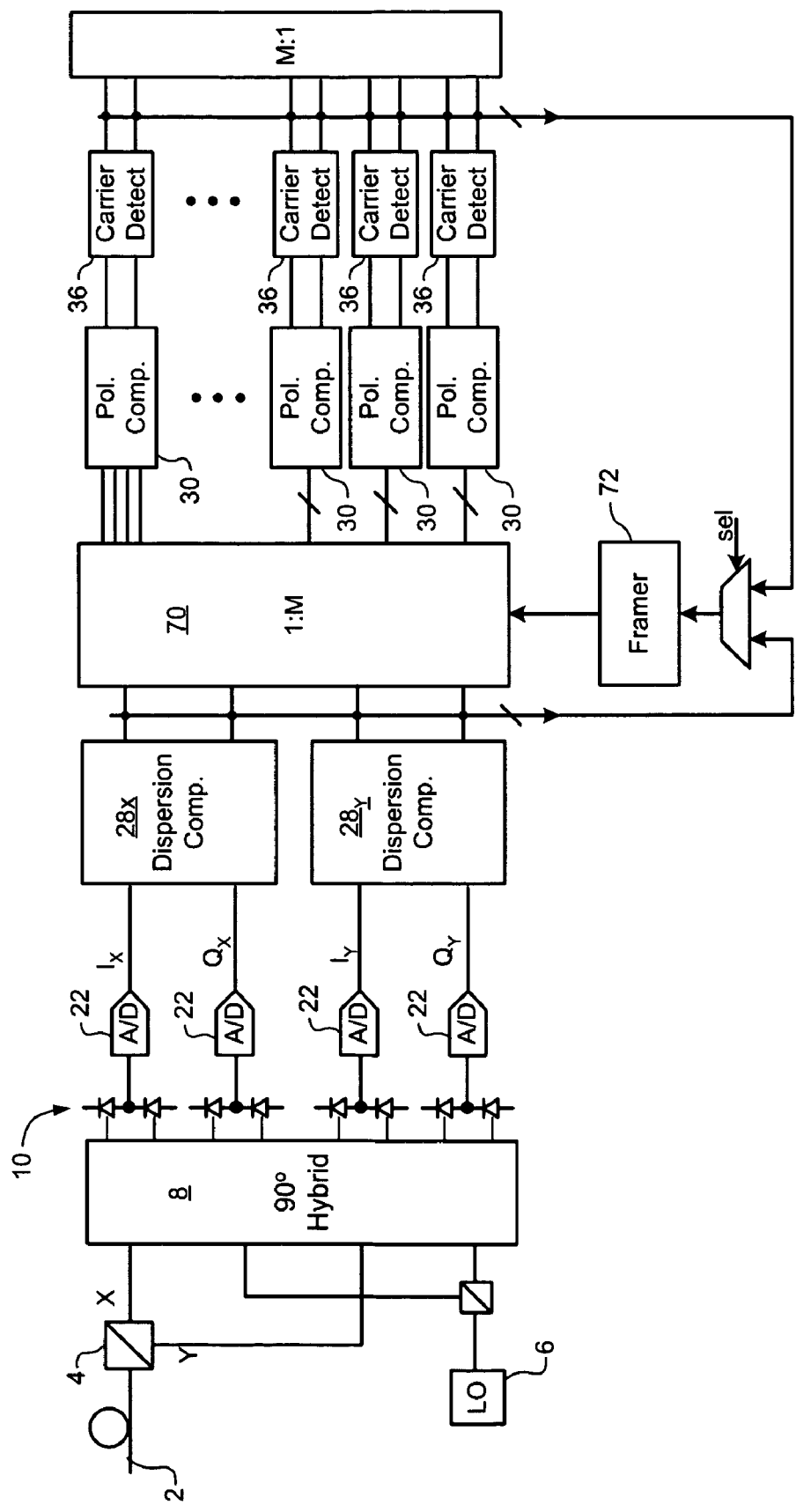
FIG. 11 is a block diagram schematically illustrating principal elements and operations of a second coherent optical receiver in which a carrier recovery block in accordance with the present invention may be implemented.

As may be seen in FIG. 11, the receiver front end is substantially identical to that of FIG. 2. Thus, an inbound optical signal is received through an optical link 2, split into orthogonal polarizations by a Polarization Beam Splitter 4, and then mixed with a Local Oscillator (LO) signal 6 by a conventional 90° optical hybrid 8. The composite optical signals emerging from the optical hybrid 8 are supplied to respective photodetectors 10, which generate corresponding analog signals. The analog photodetector signals are sampled by respective Analog-to-Digital (A/D) converters 22 to yield multi-bit digital sample streams corresponding to In-phase (I) and Quadrature (Q) components of each of the received polarizations, which are then processed by the dispersion compensators 28 as described above.

In the embodiment of FIG. 11, the dispersion-compensated sample streams appearing at the output of the dispersion compensators 28 are then supplied to a 1:M distribution unit 70, which operates to partition the dispersion compensated sample stream into M parallel sample streams, each of which can be processed at a lower sample rate (by a factor of M).

In the illustrated embodiments, the distribution unit 70 is implemented as a "burst switch" controlled by a framer 72, to generate overlapping blocks of samples 74 (FIG. 12). One implementation of a burst switch may, for example, include a multi-port Random Access Memory (RAM), which provides a respective set of registers for each data path. This arrangement allows samples to be simultaneously supplied to two or more data paths, while at the same time accommodating the change in clock speed.

Figure 12A:
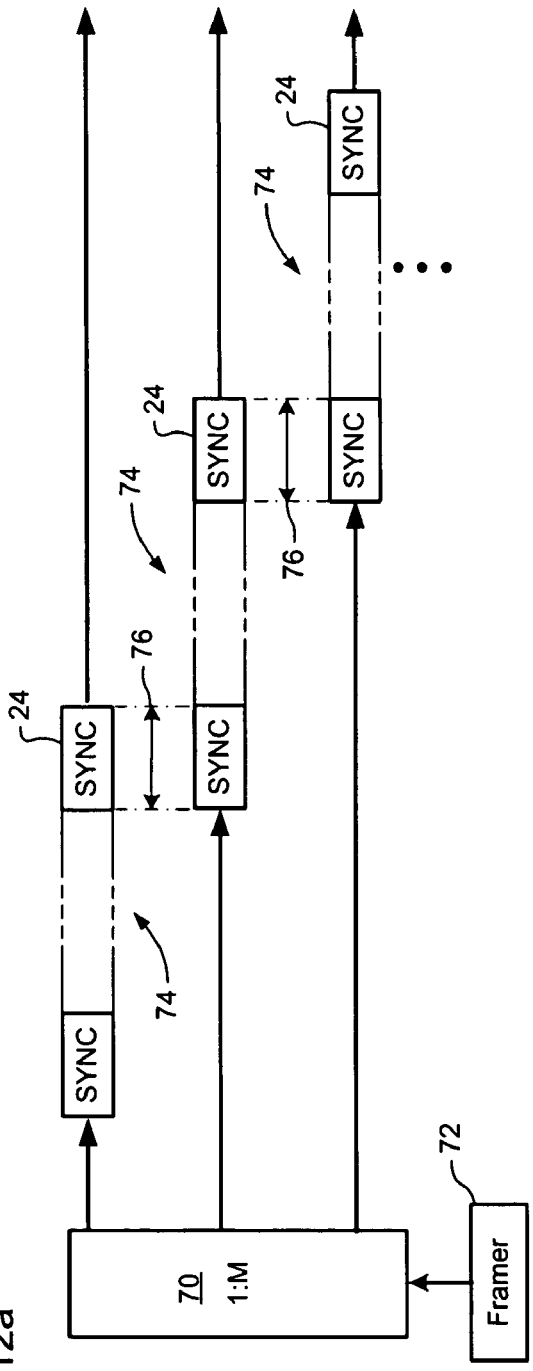
FIGS. 12a and 12b schematically illustrate respective different sample blocks generated by the distribution unit of FIG. 11.

FIG. 12a shows an embodiment in which each block of samples 74 encompasses two consecutive SYNC bursts 24, and any data symbols 26 lying between them. In this case, the amount of overlap 76 between sample blocks 74 in adjacent data paths is nominally equivalent to one SYNC burst 24. In some cases, it may desirable to increase the amount of overlap (e.g. by about the width of the polarization compensators) to ensure continuity of polarization compensation across all of the samples encompassing both of the involved SYNC bursts 24.

Figure 12B:
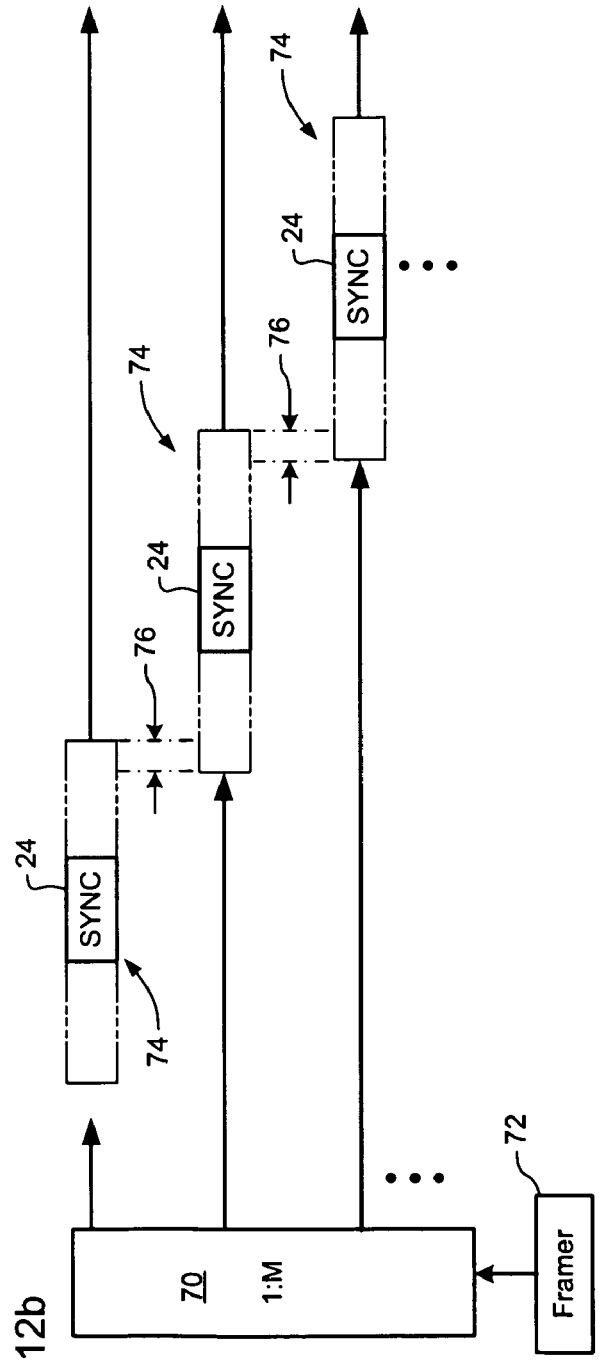

In the embodiment of FIG. 12b, each block of samples 74 is centered on a SYNC burst 24, and nominally spans half of the samples 26 between the involved SYNC burst 24 and each of the immediately preceding and following SYNC bursts. A number of "buffer" samples, equal to the width of the polarization compensator 30, are added at each end of the sample block 74 to ensure continuity of polarization compensation. These buffer samples, define the minimum desirable amount of overlap 76 between sample blocks 74 in adjacent data paths.

Returning to FIG. 11, each data path includes a respective polarization compensator 30 and carrier detector blocks 36, both of which can operate substantially as described above with reference to FIGS. 2-10b. The only real difference is that in the embodiments of FIGS. 2-10b, the receiver enters the training mode during processing of a SYNC burst 24, and then operates in the data detection mode to process all of the data symbols 26 until the next SYNC burst 24 is received. In contrast, each data path in the embodiment of FIG. 11 operates independently to process samples on a block-by-block basis. Thus, each path enters the training mode to process the SYNC burst 24 of a sample block 74, and then data detection mode to detect the data symbols of that block 74. The final frequency offset parameter $\psi(N)$ and symbol phase difference $\Delta\phi(N)$ values obtained at the completion of processing of a sample block 74 is then used as the corresponding initial values $\psi_0$ and $\Delta\phi_0$ for the next block of samples 74.

Figure 13A:
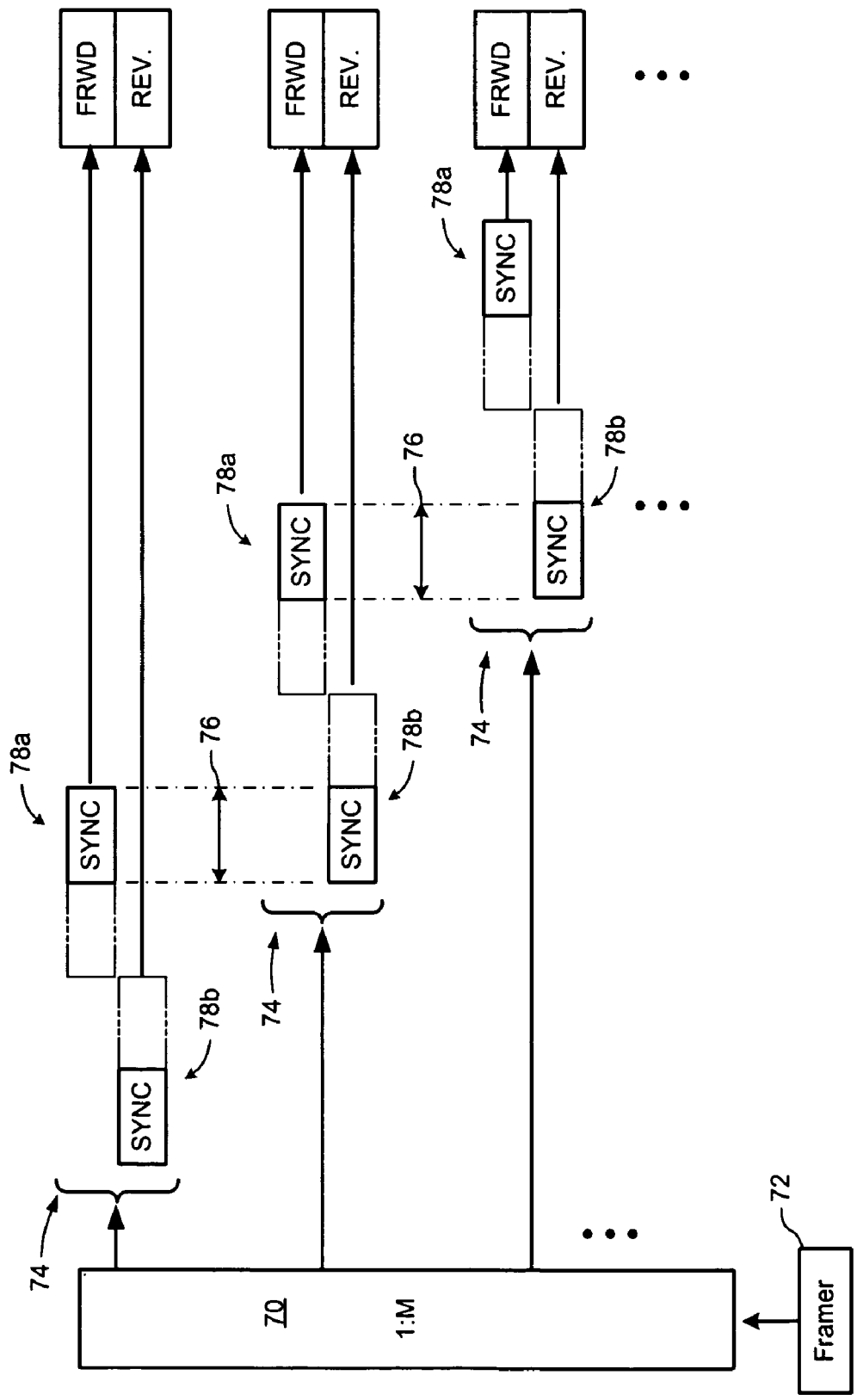
FIGS. 13a and 13b schematically illustrate further respective different sample blocks generated by the distribution unit of FIG. 11.
Figure 13B:
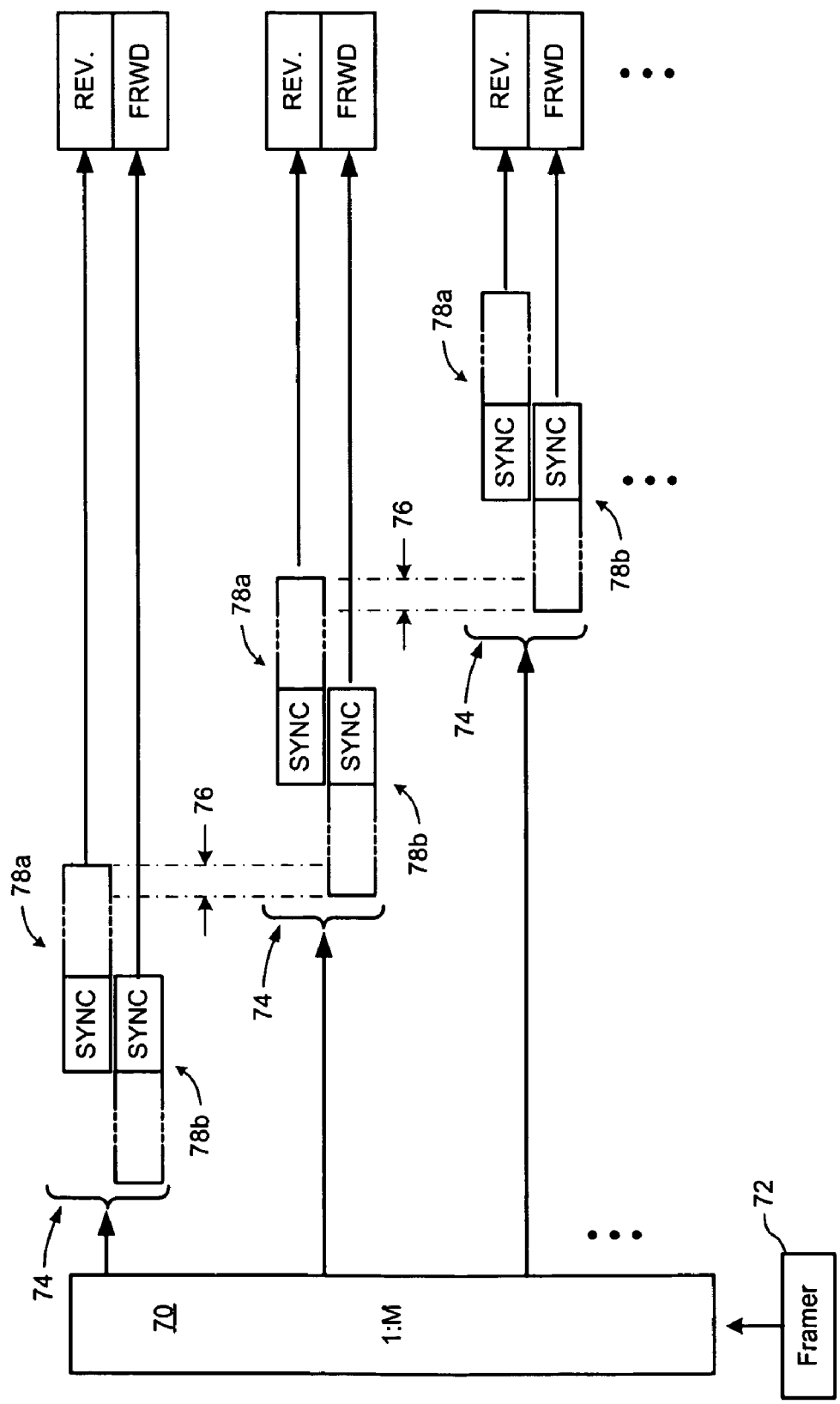

As described above, carrier phase tracking and decoding of data symbols is based on initial frequency offset and symbol phase estimates obtained by processing the SYNC burst 24. Clearly, this operation presumes that the SYNC burst 24 is processed before the data samples. For cases in which SYNC burst 24 leads the data samples within the optical signal or sample block 74, this operation is obvious. However, it will also be appreciated that by selecting the order in which data samples are read from the distribution block 70, it is possible to reverse the time-order of the sample stream, so that the above-described methods can be used to process data samples that lead the SYNC burst 24 in the optical signal. Thus, for example, the sample blocks of FIGS. 12a and 12b may be divided into sub-blocks as shown in FIGS. 13a and 13b. In this case, each data path is divided into respective "forward" and "reverse" processing path, each of which operates as described above with reference to FIGS. 5-10, except that the samples within the "reverse" processing path are time-reversed, so that the order of the corresponding recovered symbols must be again reversed at the output of the carrier recovery block 36.

In spite of the increase in complexity implied by the use of parallel forward and reverse processing paths, this arrangement can be beneficial in that it limits the effects of cycle slips. In particular, when a cycle slip occurs, all of the symbols lying between the slip location and the next SYNC burst 24 may be erroneously decoded. Dividing each sample block 74 into independently processed sub-blocks constrains the effects of a cycle slip to the involved sub-block. This is equivalent to doubling the repetition rate of the SYNC bursts 24, but without the attendant penalty of doubling the overhead.

The embodiments of the invention described above are intended to be illustrative only. The scope of the invention is therefore intended to be limited solely by the scope of the appended claims.

We claim:

1. A method of carrier recovery from a high speed optical signal received through an optical communications network, the method comprising:
    a polarization compensator processing a stream of multi-bit digital samples of the optical signal to generate a multi-bit estimate X'(n) of each one of a plurality of transmitted symbols; and
    a carrier recovery block:
        rotating a phase of each symbol estimate X'(n); and
        detecting a respective symbol phase error $\Delta\phi(n)$ of each successive rotated symbol estimate;
    wherein the stream of multi-bit digital samples comprises a block of contiguous samples encompassing at least one SYNC burst and a plurality of data symbols, each SYNC burst having a predetermined symbol sequence.

2. A method as claimed in claim 1, wherein the step of processing a stream of multi-bit digital samples of the optical signal comprises steps of:
    processing the multi-bit digital samples to generate a dispersion compensated symbol stream; and
    deconvolving a transmitted polarization from the dispersion compensated symbol stream to generate a respective stream of multi-bit symbol estimates.

3. A method as claimed in claim 2, wherein the step of deconvolving a transmitted polarization from the dispersion compensated symbol stream comprises a step of compensating a polarization angle difference between the transmitted polarization and the received optical signal.

4. A method as claimed in claim 1, wherein each multi-bit symbol estimate comprises a respective multi-bit estimate of amplitude and a phase components of a corresponding transmitted symbol.

5. A method as claimed in claim 1, wherein the transmitted symbols are encoded using any one of BPSK, QPSK, DPSK, ASK, and QAM symbol formats.

6. A method as claimed in claim 1, further comprising a step of computing the estimated total phase error based on the detected phase error of each of a plurality of rotated symbol estimates.

7. A method as claimed in claim 1, wherein the step of rotating a phase of each symbol estimate comprises steps of:
estimating a total carrier phase error $\kappa(n+1)$ of a next symbol estimate X'(n+1) based on respective detected symbol phase errors $\Delta\phi(n)$ of previously processed rotated symbol estimates; and
rotating the phase of the next symbol estimate X'(n+1) using the estimated carrier phase error $\kappa(n+1)$.

8. A method as claimed in claim 7, wherein the step of rotating a phase of each symbol further comprises a step of adjusting the estimated total carrier phase error $\kappa(n+1)$ based on respective detected symbol phase errors $\Delta\phi(m)$ of successively processed symbol estimates.

9. A method as claimed in claim 7, wherein the step of estimating a total carrier phase error $\kappa(n+1)$ comprises steps of:
computing a respective frequency offset parameter $\psi(n)$ based on the respective symbol phase errors $\Delta\phi(n)$ of previously processed symbol estimates;
computing the estimated total carrier phase error $\kappa(n+1)$ based on the offset parameter $\psi(n)$ and the respective symbol phase error $\Delta\phi(n)$ of an immediately preceding symbol estimate.

10. A method as claimed in claim 9, wherein the step of computing a respective frequency offset parameter $\psi(n)$ comprises a step of accumulating respective symbol phase errors $\Delta\phi(n)$ over a predetermined number of successive symbols.

11. A method as claimed in claim 9, wherein the step of computing the estimated total carrier phase error $\kappa(n+1)$ comprises steps of:
computing a starting phase $\Omega(n_0)$;
computing a respective incremental phase change $$\frac{i \cdot \Psi(n_0)}{2\pi}$$

for each successive symbol Si; and
adding the starting phase $\Omega(n_0)$, incremental phase change $$\frac{i \cdot \Psi(n_0)}{2\pi}$$

and symbol phase error $\Delta\phi(n)$.

12. A method as claimed in claim 11, wherein the starting phase $\Omega(n_0)$ and incremental phase change $$\frac{i \cdot \Psi(n_0)}{2\pi}$$

are computed cyclically within an update cycle spanning a predetermined number p of successive symbols Si ($0 \leq i \leq [p-1]$), and wherein the starting phase $\Omega(n_0)$ corresponds to the sum of the incremental phase changes of an immediately preceding update cycle.

13. A method as claimed in claim 7, wherein the step of rotating a phase of each symbol estimate comprises steps of:
processing the symbol estimate X'(n) to obtain a corresponding symbol phase estimate $\theta(n)$; and
subtracting the estimated carrier phase error $\kappa(n+1)$ from the symbol phase estimate $\theta(n)$.

14. A method as claimed in claim 1, wherein the step of detecting a phase error of each rotated symbol estimate comprises steps of:
deciding a respective symbol value for each rotated symbol estimate; and
detecting a phase difference between the rotated symbol estimate and the respective symbol value.

15. A method as claimed in claim 14, wherein the step of deciding a respective symbol value comprises a step of mapping two most significant bits (MSBs) of the rotated symbol estimate to a corresponding symbol value.

16. A method as claimed in claim 14, wherein the step of detecting a phase difference between the rotated symbol estimate and the respective symbol value comprises steps of:
computing a correlation between the rotated symbol estimate and the respective symbol value; and
selecting an imaginary part of the computed correlation.

17. A method as claimed in claim 14, wherein the step of detecting a phase difference between the rotated symbol estimate and the respective symbol value comprises a step of selecting a state-splitting bit (SSB) of the rotated symbol estimate.

18. A method as claimed in claim 17, wherein the transmitted symbols are QPSK encoded, and the SSB is a third MSB of the rotated symbol estimate.

19. A method as claimed in claim 17, wherein the transmitted symbols are DPSK encoded, and the SSB is a second MSB of the rotated symbol estimate.

20. A method as claimed in claim 14, wherein the step of detecting a phase difference between the rotated symbol estimate and the respective symbol value comprises a step of selecting two or more less significant bits of the rotated symbol estimate.

21. A method as claimed in claim 20, further comprising a step of accumulating a predetermined number of successive detected phase difference values.

22. A method as claimed in claim 1, wherein the step of rotating a phase of each symbol estimate comprises the step of:
estimating a carrier phase at a symbol estimate based on, at least in part, both a detected symbol phase error of a previously transmitted symbol; and a detected symbol phase error of a subsequently transmitted symbol.

* * * * *